US010626274B2

(12) United States Patent
Lark

(10) Patent No.: US 10,626,274 B2
(45) Date of Patent: Apr. 21, 2020

(54) NANOTECHNOLOGY ADDITIVE TO ENHANCE FIBER COHESION

(71) Applicant: John Callow Lark, Columbus, GA (US)

(72) Inventor: John Callow Lark, Columbus, GA (US)

(*) Notice: Subject to any disclaimer, the term of this patent is extended or adjusted under 35 U.S.C. 154(b) by 55 days.

(21) Appl. No.: 15/767,898

(22) PCT Filed: Oct. 12, 2016

(86) PCT No.: PCT/US2016/056622
§ 371 (c)(1),
(2) Date: Apr. 12, 2018

(87) PCT Pub. No.: WO2017/066310
PCT Pub. Date: Apr. 20, 2017

(65) Prior Publication Data
US 2018/0298194 A1 Oct. 18, 2018

Related U.S. Application Data

(60) Provisional application No. 62/240,143, filed on Oct. 12, 2015.

(51) Int. Cl.
C08L 93/04 (2006.01)
D06M 15/507 (2006.01)
C08L 33/14 (2006.01)
D06M 15/03 (2006.01)
D06N 1/00 (2006.01)
D06M 23/12 (2006.01)
(Continued)

(52) U.S. Cl.
CPC ............... C08L 93/04 (2013.01); C08L 33/04 (2013.01); C08L 33/14 (2013.01); C08L 33/24 (2013.01); D06M 11/79 (2013.01); D06M 13/432 (2013.01); D06M 15/03 (2013.01); D06M 15/507 (2013.01); D06M 15/59 (2013.01); D06M 23/12 (2013.01); D06N 1/00 (2013.01); D06M 2101/06 (2013.01); D06M 2101/32 (2013.01); D06M 2101/34 (2013.01)

(58) Field of Classification Search
CPC .......... C08L 93/04; C08L 33/04; C08L 33/14; C08L 33/24; D06M 11/79; D06M 13/432; D06M 15/03; D06M 15/507; D06M 15/59; D06M 23/12; D06M 2101/06; D06M 2101/32; D06M 2101/34; D06N 1/00
USPC ........................................................ 524/798
See application file for complete search history.

(56) References Cited

U.S. PATENT DOCUMENTS 5,859,118 A 1/1999 Roesler et al.
5,965,636 A 10/1999 Lark
(Continued)

OTHER PUBLICATIONS

International Search Report and Written Opinion were dated Feb. 17, 2017 by the International Searching Authority for International Application No. PCT/US2016/056622, filed on Oct. 12, 2016 and published as WO/2017/066310 on Apr. 20, 2017 (Applicant—John, Callow Lark) (17 Pages).

(Continued)

Primary Examiner — William K Cheung
(74) Attorney, Agent, or Firm — Ballard Spahr LLP

(57) ABSTRACT

Compositions for improving fiber cohesion, including a stabilized, encapsulated colloidal silica material and a modified rosin ester composition, together with methods for making and using the same.

11 Claims, 3 Drawing Sheets

(51) Int. Cl.
*D06M 13/432* (2006.01)
*D06M 11/79* (2006.01)
*C08L 33/04* (2006.01)
*C08L 33/24* (2006.01)
*D06M 15/59* (2006.01)
*D06M 101/32* (2006.01)
*D06M 101/06* (2006.01)
*D06M 101/34* (2006.01)

(56) References Cited

U.S. PATENT DOCUMENTS

2005/0065238 A1  3/2005  Lark
2005/0266184 A1* 12/2005  Kobayashi ........... G03G 7/0026
                                              428/32.38

OTHER PUBLICATIONS

International Preliminary Report on Patentability was dated Apr. 17, 2018 by the International Searching Authority for International Application No. PCT/US2016/056622, filed on Oct. 12, 2016 and published as WO/2017/066310 on Apr. 20, 2017 (Applicant—John, Callow Lark) (14 Pages).

* cited by examiner

NANOTECHNOLOGY ADDITIVE TO ENHANCE FIBER COHESION

CROSS REFERENCE TO RELATED APPLICATIONS

The present application is a national phase filing under 35 U.S.C. § 371 of International Application No. PCT/US2016/056622, filed on Oct. 12, 2016, which claims priority to U.S. provisional application U.S. Ser. No. 62/240,143, filed on Oct. 12, 2015, the contents of which are incorporated herein by reference in their entirety.

FIELD OF INVENTION

This disclosure relates generally to additives for textile fiber materials and to textile fiber materials having enhanced fiber cohesion, together with methods for preparing and using the same.

BACKGROUND

The introduction of polyester/cotton permanent press fabrics in the 1960's was an immediate marketing success that also brought significant challenges to the fabric industry. In the textile industry, size materials are typically applied to yarns, prior to weaving, to strengthen the yarn and reduce breakage during the weaving process. For permanent press fabrics, conventional starch based warp sizes developed for cotton were incompatible with polyester fiber and would not adhere to the warp yarn. Abrasive forces developed by the loom quickly destroyed the warp yarn, resulting in a weaving industry that could not meet the growing demand.

Size suppliers began evaluating polyvinyl alcohol (PVA) as a primary film former in their formulations. PVA forms a strong film around the outside of the yarn and does not rely on adhesion to the fiber bundle to provide abrasion resistance. PVA was an answer to the problem and was quickly adopted by the industry. While PVA based compositions cannot access the interior areas of yarn bundles, these compositions became the industry standard despite persisting low yarn quality issues.

Other materials, such as colloidal silica, have been explored for use in sizing compositions, but the abrasive nature of such materials resulted in undesirable wear on manufacturing equipment. More recently, efforts to encapsulate colloidal silica particles with a protective barrier were explored using low molecular weight polyester resins. The resulting encapsulated colloidal silica complex could then be added to a conventional PVA/starch size formulation. The two component system could be formed rapidly, but was only stable for short periods of time before the colloidal silica escaped from the protective barrier, resulting in gelling and rapid agglomeration. Efforts to stabilize the two component system using polyglycols were also attempted with limited success. While the polyglycol stabilized formulations improved woolen yarn production and reduced fiber shed in knitting package dyed cotton yarn, the formulations did not provide significant improvement in weaving performance.

Accordingly, there remains a need in the fabric industry for compositions and methods to enhance fiber cohesion. This need and other needs are satisfied by the various aspects of the present disclosure.

SUMMARY OF THE INVENTION

In accordance with the purposes of the invention, as embodied and broadly described herein, the invention provides a stabilized, encapsulated colloidal silica composition, as described herein.

In further aspects, the invention also provides a method for treating a fiber, comprising contacting the fiber with a stabilized, encapsulated colloidal silica composition, as described herein.

In yet further aspects, the invention provides a treated fiber, wherein a virgin fiber has been contacted with a stabilized encapsulated colloidal silica composition, as described herein.

While aspects of the present invention can be described and claimed in a particular statutory class, such as the system statutory class, this is for convenience only, and one of skill in the art would understand that each aspect of the present invention can be described and claimed in any statutory class. Unless otherwise expressly stated, it is no way intended that any method or aspect set forth herein be construed as requiring that its steps be performed in a specific order. Accordingly, where a method claim does not specifically state in the claims or description that the steps are to be limited to a specific order, it is no way intended that an order be inferred in any respect.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying figures, which are incorporated in and constitute a part of this specification, illustrate several aspects and together with the description serve to explain the principles of the invention.

Figure 1:
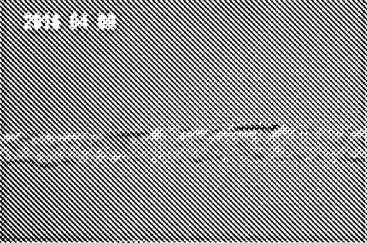
FIG. 1 illustrates a sized yarn after treatment with a PVA/starch composition and a dry acrylamide and stabilized polyester complex, in accordance with various aspects of the present disclosure.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description of the invention.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, exemplary methods and materials are now described.

Moreover, it is to be understood that unless expressly stated otherwise, it is in no way intended that any method set forth herein be construed as requiring that its steps be performed in a specific order. Accordingly, where method claim does not actually recite an order to be followed by its steps or it is not otherwise specifically stated in the claims or descriptions that the steps are to be limited to a specific order, it is no way intended that an order be inferred, in any respect.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a lubricant" includes two or more lubricants.

As used herein, the terms "about" and "at or about" mean that the amount or value in question can be the value designated some other value approximately or about the same. It is generally understood, as used herein, that it is the nominal value indicated up to ±10% variation unless otherwise indicated or implied. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not.

As used herein, the ten "loom" is intended to refer to a machine that produces fabric.

As used herein, the term "warp yarn" is intended to refer to the machine direction yarn in a fabric.

As used herein, the term "filling yarn" is intended to refer to the cross machine direction yarn in a fabric.

As used herein, the term "spun yarn" is intended to refer to staple fiber (i.e., short fibers) spun into a continuous yarn.

As used herein, the term "yarn count" is intended to refer to the number of yards needed to form one pound of yarn multiplied by 840. For example, 6's yarn that can be used for denim, ground warp in towels, etc., can be approximately 5,040 yards per pound, 36's yarn that can be used for sheeting, shirting, etc., can be approximately 30,240 yards per pound; and 120's yarn that can be used for high end upholstery can be approximately 100,800 yards per pound.

As used herein, the term "warp sizing" is intended to refer to the process of applying a film former based formulation to a warp yarn.

As used herein, the term "pix" is intended to refer to the insertion of a filling yarn in the process of fabric formation.

As used herein, the term "heddle" is intended to refer to a thin metal strip with a hole containing a warp yarn that raises and lowers the yarn in order to provide a path for the filling yarn to travel to the other side of the loom.

As used herein, the term "beat-up" is intended to refer to compacting of the just inserted filling yarn into a formed fabric.

As used herein, the term "warp abrasion" is intended to refer to the level of disruption of the sized yarn through contact with the metallic components of the loom and adjacent sized yarns.

As used herein, the terms "warp stop" or "warp stops" are intended to refer to the number of warp yarn failures per 100,000 filling yarn insertions. In one aspect, the warp stops can reflect the quality of a warp size formulation and/or the quality of a yarn. In another aspect, the number of yarns comprising a warp can be dependent upon, for example, the fabric style, yarn count, and the width of the loom beam.

As used herein, the term "filling stops" is intended to refer to the number of filling yarn stops per 100,000 insertions. While not intending to be limiting, filling stops typically occur due to protruding sized fiber and not due to yarn failure.

As used herein, the term "slasher" is intended to refer to a machine used to apply and dry a size formulation on the warp yarn.

As used herein, the term "dry size sheet" is intended to refer to a sized warp yarn sheet as it exits the drying section of a slasher. In various aspects, a dry size sheet is a continuous yarn sheet glued together by the size.

As used herein, the term "loom beam" is intended to refer to a beam on a loom, onto which sized warp yarn is placed.

As used herein, the term "bust rods" is intended to refer to a set of stainless steel rods which break a sized sheet into individual sized yarn, which are then collected on a loom beam.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are materials to be used in the preparation of components of the invention, the components of the invention themselves, and methods for the manufacture and use of such components. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular component is disclosed and discussed and a number of modifications that can be made to a number of materials including the components are discussed, specifically contemplated is each and every combination and permutation of the components and the modifications that are possible unless specifically indicated to the contrary. Thus, if a class of materials A, B, and C are disclosed as well as a class of materials D, B, and F and an example of a combination materials, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

As used herein, the term or phrase "sufficient," "sufficient amount," or "conditions sufficient to" refers to such amount or condition that is capable of performing the function or property for which a sufficient amount or condition is expressed. As will be pointed out below, the exact amount or particular condition required can vary from one aspect to another, depending on recognized variables such as the materials employed and the processing conditions observed; however, it should be understood that an appropriate effective amount or condition could be readily determined by one of ordinary skill in the art in possession of this disclosure using only routine experimentation.

As used herein, the term "substantially," when used in reference to a composition, refers to more than about 98% by weight, more than about 98.5% by weight, more than about 99% by weight, more than about 99.5% by weight, or more than about 99.9% by weight, based on the total weight of the composition, of a specified feature or component.

It is understood that the compositions disclosed herein have certain functions. Disclosed herein are certain requirements for performing the disclosed thnctions and it is understood that there are a variety of embodiments that can perform the same function that are related to the disclosed compositions, and that these compositions will typically achieve the same result.

References herein to various improvements in, for example, performance, are intended to refer to a comparison to conventional formulations and methods known to those of skill in the art, not comprising the inventive technologies described herein.

Each of the precursor and starting materials described herein for preparing the inventive compositions are commercially available.

As briefly described above, one of the companies that produced colloidal silica in the 1950's theorized that small silica particles could be utilized to provide added friction on cotton fiber and improve cotton spun yarn formation. This theory was presented to the management of textile mills in the southeastern USA and trials were initiated to demonstrate results. The results were outstanding with improved yarn physical properties and improved weaving performance when using the improved yarn. The concept spread through the industry like wildfire and was quickly instituted into the manufacturing process. Unfortunately, little concern was initially given to the fact that once the colloidal silica dispersions dried, the colloids concentrated and agglomerated to form large sand like particles. Mills that were early adopters of the colloidal silica technology noticed that their equipment was being abraded by these sand like particles. While a boon to replacement machinery suppliers, the mills quickly abandoned the efforts and avoided other changes to sizing materials.

In a conventional warp size formulation, a high molecular weight polymeric material is deposited and dried on the surface of a yarn with minimal penetration into the yarn itself. These high molecular weight materials (HMW) can be either natural (starch) or petroleum derived (e.g., PVA) that are supplemented with humectants and lubricating waxes. Extensive studies have demonstrated that the HMW materials be maintained on the surface of the treated yarn to minimize undesirable brittle character in the sized yarn, which can accelerate yarn failure in the flexing actions of a loom. In an ideal situation, the process of warp sizing using a HMW sizing composition only penetrates the surface of the yarn bundle to a microscopic depth to provide adhesion to the yarn.

The present disclosure provides improved compositions and methods for treating and/or sizing materials used in the textile industry. In one aspect, an improved composition comprises a stabilized, encapsulated colloidal silica product. In another aspect, an improved composition comprises a rosin ester, such as a water dispersible, modified rosin ester. In still other aspects, the improved compositions can be utilized alone, in combination, with other conventional materials, or with other materials not conventionally used in the textile industry. It should be understood that a recitation of any properties, applications, fibers, or benefits related to one inventive composition or method can also be applicable to other compositions and methods described herein, unless specifically stated to the contrary. Similarly, recitations of treatment methods for any yarn, fiber, bundle, or filament should be interpreted as also applicable to any other yarn, fiber, bundle, or filament disclosed herein or suitable for use with the disclosed technology, unless specifically recited to the contrary or unless such use would be incompatible with such yarn, fiber, bundle, or filament.

The action of an encapsulated nanosized additive, such as that of the present disclosure, on yarn, for example, can provide a completely different effect than that provided by conventional HMW materials applied to the surface of a sized yarn. With extremely small physical size and large surface areas, low levels of the inventive encapsulated nanosized additive can, in various aspects, penetrate the bulk of the yarn to directly influence the surface character of individual fibers. Deposition of these encapsulated nanosized compositions can thus enhance the cohesive properties of fibers comprising the yarn to provide an improvement in the yarn itself. This improvement can be reflected in a more compact and uniform yarn with improved tensile and elongation properties. Recognizing that the yarn is the most important component of the entire process, an improved yarn can provide an improved substrate for traditional high molecular weight film formers. These improvements in the yarn provide a lower coefficient of variation in the sized yarn bundle in both tensile and elongation properties. With an improvement in fiber cohesion within the sized yarn bundle, the affected fibers tend to remain in place and reduce fiber shed during the weaving process. These improvements can also allow less traditional sizing material while providing equal or greater protection through the fabric formation process.

Thus, in the present invention, encapsulated colloidal silica nanoparticles can be stabilized and dispersed to provide the originally intended benefits of colloidal silica in sizing compositions, such as, for example, those described in U.S. Pat. No. 4,728,679, which is hereby incorporated by reference in its entirety, in a stabilized one component liquid product. In another aspect, such benefits can be provided without damage to mill equipment. In addition, the addition of relatively low levels of encapsulated nanosized additives into a warp size formulation can provide one or more distinct advantages, reflected in the improvement of fiber cohesion within the yarn bundle.

In addition, removal of the encapsulated nanosized additives or warp size formulations containing the encapsulated nanosized additives can be performed easily from a formed fabric utilizing conventional desize procedures currently in place.

Due to the unique chemical structure and functionality of these encapsulated nanosized materials, the effect of enhancing fiber cohesion in the yarn bundle is not fiber specific and positive effects can, in various aspects, be achieved with virtually all staple and filament fiber yarns.

Although the sizing of a continuous filament can be significantly different from the sizing of a staple fiber, a polymeric material still needs to be applied to protect the yarn from abrasion. Due to the high number of small and thin individual filaments in a continuous filament yarn, a protective barrier typically needs to be applied to prevent the rupture of any individual filament. In one aspect, a filament yarn sheet can be passed through a bath containing a conventional polymeric size in the same process as is done in staple yarn sizing. The sized yarn sheet can then be subjected to a procedure to separate the individual sized yarns. Unless a procedure is put into place to separate the sheet in the wet state to the individual sized yarn before drying, care should be taken to insure that the sheet separates easily. Failure to adequately separate the sized yarn can result in ruptures of the individual filaments and an inferior quality fabric.

Thus, in various aspects, the addition of nanosized materials, such as those of the present disclosure, to conventional filament warp sizing formulations can provide the same effect as is seen in staple sizing, in one aspect, the use of the inventive nanosized materials can provide individual filaments that are more tightly attracted and are more resistant to filament breakage during the splitting and drying process. This effectively promotes the formation of a more compact filament yarn that requires less of the high molecular weight primary sizing agent on the surface of the filament bundle. This provides less of the high molecular weight primary sizing agent to separate at the bust bar section and provides an easier separation to individual sized filament yarn.

In various aspects and as generally described above, the present invention relates to size compositions useful in the fabric manufacturing industry. In one aspect, a size composition can comprise an encapsulated colloidal silica material, such as that described in detail in U.S. Pat. No. 4,728,679, which is hereby incorporated by reference in its entirety for the purpose of teaching the use of encapsulated colloidal silica containing size compositions in fabric manufacture. The encapsulated colloidal silica size formulations described in U.S. Pat. No. 4,728,679 provide improvements in woven fabric manufacture, but the transient nature of the encapsulated colloid lacked the necessary stability in a one piece product for widespread industrial application. The present invention improves upon this encapsulated colloidal silica complex by providing a stabilized, encapsulated colloidal silica composition. It has surprisingly been found that the addition of urea, as described here, can stabilize the encapsulated colloidal silica and prevent aggregation and/or agglomeration and the deleterious effects thereof. Thus, in one aspect, the inventive composition comprises a stabilized, encapsulated colloidal silica.

In another aspect, the inclusion of the inventive stabilized, colloidal encapsulated silica and/or water dispersible derivatives of rosin esters has been shown to positively affect fiber cohesion properties. In another aspect, this positive effect can provide an avenue to enhance the attraction of fibers within the structure of a fiber bundle. The enhanced attraction between fibers can provide an increased level of uniformity in the resulting yarn bundle and thus, improved performance in subsequent fabric formation.

In other aspects, the nanosized characteristic of the inventive chemistries described herein can provide a large surface area deposited on the surface of fiber in the treated bundle to provide improve yarn properties.

In spun yarn systems, both traditional and modern formation systems provide a non-uniform product. These yarns have been shown to possess sections of inconsistent levels of fiber within the yarn bundle. In some sections, an insufficient number of fibers can be present. In other sections, the number of fibers can exceed specifications. In lower fiber sections, both tensile and elongation properties can be below specifications for a given count of yarn, resulting in weaker sections and lower elongation characteristics, which can disrupt yarn processing. For high fiber sections, the application of conventional sizing materials is not typically necessary to improve the yarn quality, as yarn failures typically do not occur in high fiber sections. When using the inventive compositions, however, the improvement in fiber cohesion can reduce the level of fiber lost during processing.

In filament yarn systems, the strength of improving fiber cohesion in such situations can provide a more compact yarn, dramatically lowering the tendency for single filament breakage in processing the sized filament yarn to the loom beam. In various aspects, the materials described herein can reduce breakage by, for example, at least about 10%, at least about 20%, at least about 25%, at least about 40%, at least about 50%, or greater, as compared to the use of conventional size materials alone. In another aspect, use of the inventive composition with filament size formulations can provide reduced amounts of the primary sizing composition on the yarn. The reduced levels of primary size provide improved quality in the fabric and an economic advantage in the use of lower primary size. In other aspects, use of the materials described herein can result in a reduction in the amount of primary size needed to effect a similar result by, for example, at least about 5%, at least about 10%, at least about 15%, at least about 20%, at least about 25%, at least about 30%, at least about 40%, or more.

Sizing compositions can comprise one or more natural or synthetic film formers combined with other optional components, such as urea and/or tallow wax. The film forming components, such as starch or PVA protect the yarn, while optional components such as urea and tallow wax can attract moisture to plasticize and weaken the sized yarn film sheet, and provide lubrication, respectively. Polyacrylic and polyester resins can provide improved adhesion of the sizing composition to the warp yarn.

In one aspect, the high molecular weight polymer or film forming component of a size formulation can comprise a natural material, such as, for example, a modified starch, a corn starch, or other starch, and/or a petroleum based material, such as, for example, polyvinyl alcohol (PVA). Other components of a size composition can comprise one or more of partially or fully hydrolyzed polyvinyl alcohols and copolymers, carboxymethyl cellulose, polymers derived from acrylic monomers, polymers derived from polyvinyl acetate and those derived from vinyl acetate monomers in combination with other monomers incorporated into the polymer via vinyl polymerization. The size composition can further optionally comprise one or more of lubricants, waxes, or humectants.

In one aspect, a conventional size formulation can comprise urea, but typically at levels significantly lower than those utilized for stabilization in the present invention. The levels of urea, if present, in a conventional size formulation would not be sufficient to prevent the silica colloid from escaping from the complex. The waterborne colloidal silica in the encapsulated stabilized colloidal encapsulated silica composition can comprise any colloidal silica material suitable for use in a sizing composition. In one aspect, the colloidal silica can comprise an amorphous silica. In another aspect, the silica can comprise a spherical or substantially/ near spherical, amorphous colloidal silica particle. Typical silica materials were typically manufactured by polymerizing water glass with sulfuric acid, and then stopping the polymerization with the addition of a base, such as, for example, sodium hydroxide, to prevent further polymerization and stabilize the formed silica particles in solution. In one aspect, urea is used as a stabilizer in the inventive one-piece product. In another aspect, the urea can be incorporated with the polyester resin and colloidal silica to prevent the colloid from escaping the complex. For clarification, the urea present as a stabilizer is different from any amount of urea present in the underlying conventional formulation. The level of urea in the underlying conventional formulation is not believed to affect the stability of the complex.

The size of a silica material can be any size suitable for use in a sizing composition. In one aspect, the silica can have an average diameter of from about 4 nm to about 150 nm, for example, about 4 nm, 5 nm, 8 nm, 10 nm, 15 nm, 20 nm, 25 nm, 30 nm, 40 nm, 50 nm, 60 nm, 70 nm, 80 nm, 90 nm, 100 nm, 110 nm, 120 nm, 130 nm, 140 nm, or about 150 nm. In another aspect, the silica can have an average diameter of from about 10 nm to about 50 nm, for example, about 10 nm, 14 nm, 18 nm, 22 nm, 26 nm, 30 nm, 34 nm, 38 nm, 42 nm, 46 nm, or 50 nm, or from about 20 nm to about 50 nm. In other aspects, the colloidal silica can have a size of about 20 nm, about 25 nm, or about 50 nm. It should be appreciated that the particle size of silica materials is a distributional property and that for a sample having a given average particle size, at least a portion of the particles can have a particle size lower than the average and at least a portion can have a particle size greater than the average.

The surface area of silica particles can depend upon the diameter of the silica particles. In various exemplary embodiments, silica materials having a particle size of 10 nm, 20 nm, and 50 nm, can have a surface area of, for example, 300 m$^2$/g, 150 m$^2$/g, and 60 m$^2$/g, respectively.

In another aspect, the inventive composition comprises a polymeric resin. In an exemplary aspect, the polymeric resin can comprise an ester, such as, for example, a polyester resin. In one aspect, a polyester resin can be prepared from isophthalic acid, diethylene glycol, and trimellitic anhydride, as described in U.S. Pat. No. 4,268,645, which is hereby incorporated by reference in its entirety generally and for the purpose of teaching polyester resin formation. In another aspect, a polyester resin can comprise a PL 725 or PL 401 polyester resin from Pioneer Chemicals, Inc. In one aspect, a polyester resin can be neutralized. In another aspect, a polyester resin can be neutralized with, for example, an amine containing material, such as a monoisopropylamine having an acid number of at least 35, or an alkanol amine, to reduce the resin into water.

In one aspect, a low molecular weight polyester resin can be prepared in a 2 phase high temperature reaction to initially prepare a polymer from isophthalic acid (IPA) and diethylene glycol (DEG) followed by a coupling of the IPA/DEG prepolymer diol with trimellitic anhydride to form a controlled 3-dimensional gel that can be dispersed in water with, for example, an organic alcoholamine material. In various aspects, any organic alkanol amine, such as, for example, methyl ethanol amine, isopropanol amine, etc., can be used. An encapsulated colloidal silica complex can be formed by the low molecular weight polyester resin and a commercially available colloidal silica material. In various aspects, the amount of low molecular weight polyester resin can be dependent upon the particle size and corresponding surface area of the colloidal silica material used, for example, from about 20 m$^2$/g to about 750 m$^2$/g. In another aspect, the ratio of polymeric resin, such as a polyester resin, to colloidal silica can range from about 3 parts resin to 1 part colloidal silica to essentially an unlimited ratio (e.g., higher concentrations of polymeric resin per unit weight of colloidal silica) to prevent escape and reaction of colloidal particles to form a gel. In still other aspects, for each of the values and/or ranges recited herein, aspects are also contemplated wherein specific values and/or ranges are lower than or higher than those recited.

In one aspect, a polyester resin can have any molecular weight suitable for use in a sizing formulation. In various aspects, polyester resins can have an average intermediate molecular weight of from about 1,000 to about 7,000. In another aspect, polyester resins can have an average intermediate molecular weight of from about 1,000 to about 3,000, from about 3,000 to about 5,000, from about 3,000 to about 7,000, or from about 5,000 to about 7,000. In another aspect, the polyester resin or a water solution comprising a reduced polyester resin contains no or substantially no volatile organic compounds.

In another aspect, the ratio of polymeric resin to colloidal silica is sufficiently high to result in substantial encapsulation or occlusion of the colloidal silica particles in the polymeric resin so that upon drying of the aqueous based composition on the sized material the colloidal silica particles will remain encapsulated or substantially encapsulated rather than agglomerating. The composition can, in various aspects, be prepared by mixing the colloidal silica and polymeric resin along with the other components, or the colloidal silica and polymeric resin can be pre-complexed and dried and later dispersed in water to form a sizing composition.

The inventive sizing composition also comprises a urea carbamide). In one aspect, the ratio of urea to resin/silica can be from approximately 0.5:1.0, by weight to approximately 1.0:1.0, or higher. In various aspects, the ratio of urea to resin/silica can be 0.5:1, 0.6:1, 0.7:1, 0.8:1, 0.9:1, 1:1, 1.2:1, 1.4:1, 1.6:1, 1.8:0, 2:1, 2.5:1, 3:1, 4:1, 5:1, or higher. In a specific exemplary aspect, the ratio of urea to resin/silica is approximately 1:1.

In one aspect, a polyester resin/silica complex can be formed from the attractive forces of the respective species as they are contacted. In another aspect, urea is added to the solution to discourage silica particles from associating with other silica particles and forming a gel. In another aspect, the amount of urea is that amount sufficient to stabilize a resin/colloidal silica dispersion for a period of at least about 10 days, at least about 30 days, at least about 1 month, at least about 2 months, at least about 3 months, at least about 6 months, or longer. In another aspect, the amount of urea is that amount sufficient to stabilize a resin/colloidal silica dispersion for the minimum industry standard of six months at ambient temperature.

The urea stabilized, encapsulated colloidal silica composition can then be contacted with any conventional sizing formulation prior to contacting with a warp yarn. In various aspects, the amount of stabilized, encapsulated colloidal silica composition can range from about 0.1 upwards, for example, from about 0.1 to about 2.0% of the primary sizing formulation (film formers, urea, wax, etc.), for example, about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0% of the primary sizing formulation. In other aspects, the amount of stabilized silica composition can be lower or higher than this range, depending on the specific fiber, style, primary sizing formulation, fabric forming machinery, and initial yarn. In another aspect, the amount of stabilized silica composition can be from about 0.1% upwards, for example, from about 0.1% to about 0.2% of the warp yarn weight.

The amount of warp size formulation can vary, depending upon the yarn count, composition, yarn quality, loom, loom speed, fabric style, etc. In various aspects, the total amount of sizing formulation on a yarn can range from near 0 to about 20% by weight, for example, about 0, 0.5, 1, 1.5, 2, 2.5, 3, 3.5, 4, 4.5, 5, 6, 7, 8, 9, 10, 12, 14, 16, 18, or 20% by weight.

In various aspects, the nanosized, stabilized, encapsulated colloidal silica composition of the present invention can access a greater portion of the fibers within a yarn, for example, at least a portion of those areas not accessible to conventional high molecular weight polymers in currently used sizing compositions or at least those areas not easily accessible to conventional high molecular weight polymers in conventional sizing compositions. In another aspect, the nanosized, stabilized, encapsulated colloidal silica composition of the present invention can access all or substantially all of the fibers within a yarn.

In other aspects, use of the inventive stabilized, encapsulated colloidal silica composition with a conventional sizing formulation can improve weaving efficiency, fabric quality, fiber retention, and/or abrasion resistance in the weaving process. In still other aspects, the inventive stabilized, encapsulated colloidal silica composition can provide uniformity and enhanced fiber cohesion in the warp sized yarn.

In yet other aspects, use of the inventive stabilized, encapsulated colloidal silica composition can significantly improve mill efficiency to levels significantly above those obtained with a conventional size formulation in the style and machinery under consideration. In various aspects, mill efficiency can be improved, for example, from about 85% to about 99%, from about 85% to about 90%, from about 85% to about 95%, or from about 88% to about 97%, when used with a PVA sizing formulation on a 50/50 polyester/cotton blend. In other aspects, the inventive stabilized silica composition can significantly reduce fiber shed. In one aspect, use of the inventive stabilized silica composition can result in fiber shed of about 25% of the amount typically observed with conventional sizing formulations, or less.

In another aspect, use of the inventive stabilized silica composition can provide improvements comparable to or greater than those from described in U.S. Pat. No. 4,728,679, in a stable single component product additive in the primary sizing formulation. The stabilized nanosized component in the sizing formulation can penetrate to the interior of the warp yarn bundle in the sizing process to provide a more compact and uniform yarn. This treatment can improve the coefficient of variation in both tensile and elongation properties. Such nanosized material penetration into the bundle can improve fiber cohesion and promote improved weaving performance by reducing warp stops by as much as about 75%, depending upon the style and machinery under consideration. In various aspects, weaving performance can be improved by, for example, about as much as about 3 warp stops/100,000 pix on indigo yarn that has been sufficiently washed to eliminate caustic interference. It should be understood that the values recited herein, for example, with respect to warp stop, can vary, depending upon, for example, styling and a particular textile process. In various aspects, it can be difficult to compare absolute values of, for example, warp stop, between different textile processes, but the present invention is intended to provide relative advantages over conventional methods.

In other aspects, the stabilized, encapsulated colloidal silica composition can be useful in other fabric processes, such as, for example, the final rinse of a package dye application. In one aspect, the stabilized, encapsulated colloidal silica composition was added in the final rinse of a package dye application and prevented fiber shedding in a knitting operation. Prior to the use of this composition, a knitting room typically required an hourly shut-down to remove shed fiber. After use of the composition, the removal of shed fiber was not required for over 24 hours. Thus, in various aspects, the time period until shed fiber needs to be removed can be extended to about 2 hours, about 4 hours, about 8 hours, about 16 hours, about 24 hours, or more. In another aspect, the time period until shed fiber needs to be removed can be increased by about 50%, about 100%, 200%, 400%, 800%, or more, as compared to a conventional process. It should be understood that factors such as a particular piece of machinery, factory design, etc., can result in differences in the absolute period of time needed prior to shed fiber removal, but the present invention can provide significant extensions of such time periods.

Thus, in one aspect, the invention can comprise a stabilized, encapsulated colloidal silica alone. In another aspect, the invention can comprise a stabilized, encapsulated colloidal silica combined with one or more conventional size formulation components.

In various aspects, the stabilized encapsulated colloidal silica composition of the present invention can be utilized with any fibrous material. In another aspect, any substrate that can be wetted by an aqueous mixture comprising the inventive stabilized, encapsulated colloidal silica composition can benefit from the fiber cohesive effect of the composition.

In various aspects, the inventive stabilized silica composition can be utilized with fibers of varying chemistry and morphology. In one aspect, the inventive colloidal silica composition can be utilized with one or more of cotton, wool, rayon, polyester, polyethylene terephthalate (PET), nylon, NOMEX®, KEVLAR®, PBI®, TWARON®, TENCEL®, P-84®, LYCRA®, glass, cellulose, carbon, phenolic, acetate, ramie, flax, polyacrylonitrile, and combinations and blends thereof. In yet another aspect, the inventive stabilized, encapsulated colloidal silica composition can be used with both woven and non-woven materials.

In another aspect, the present invention comprises water dispersible rosin ester based compositions that can provide one or more benefits to a textile material or the handling thereof in such an aspect, water dispersible rosin ester based derivatives can provide improved cohesion properties when used on fiber substrates which are not normally compatible with the polyester encapsulated resin complex. High pH conditions also provide situations in which elevated pH conditions render the encapsulated colloidal silica complex inactive. The modified water dispersible rosin esters of the present invention are not affected by elevated pH conditions and can provide the same functionality to sized yarn as the stabilized encapsulated colloidal silica complex. The modified water dispersible rosin esters are also compatible with and can provide adhesion to fiber substrates which are incompatible with the encapsulated stabilized encapsulated colloidal silica system. The modified water dispersible rosin esters can thus provide the benefits in conventional warp size formulations at near neutral pH levels, as well as at elevated pH environments, as demonstrated.

For denim fabrics, the indigo molecule is insoluble in water in its native state, and must be converted to a water soluble species to penetrate a bundle of yarn (rope) in the initial stage of the indigo dyeing process. This conversion is typically accomplished using sodium hydrosulfite ($Na_2S_2O_4$) under basic conditions, allowing for the formation of the soluble leucoindigo species which can penetrate the yarn bundle. The dyed rope of yarn is then oxidized by exposure to air to revert the leucoindigo molecule to insoluble indigo, resulting in dyed blue yarn.

As prior polyester encapsulated silica technologies were sensitive to pH, the basic conditions present in the denim manufacturing process render these prior technologies unsuitable and unreliable. Under basic conditions, the pH sensitive complex is shocked, forming an insoluble, intractable, inactive mass. For economic reasons, it is typically not feasible to completely rinse the caustic from the indigo dyed rope following the oxidation step. Many manufacturers also add extra caustic to mercerize the dyed yarn so as to provide a stronger and more lustrous yarn.

In one aspect, the present invention utilizes modified derivatives of rosin esters that exhibit compatibility at higher pH environments. Thus, with the present water dispersible modified rosin ester materials, the same effects observed at neutral pH in other systems can be observed at higher pH with denim fabrics. While not wishing to be bound by theory, it is expected that the inventive neutralized rosin ester compositions can provide similar benefits in both ring spun style denim and open end yarn styles, as well as fabric styles sized with formulations of near neutral pH.

The use of these modified rosin esters can also be utilized to improve fiber cohesion in, for example, package dyed knit fabric. Improved fiber cohesion has been shown to reduce fiber shed in the knitting process which can improve productivity, fabric quality, and needle life.

In another aspect, the inclusion of the inventive stabilized, colloidal encapsulated silica and/or water dispersible derivatives of rosin esters has been shown to positively affect fiber cohesion properties. In another aspect, this positive effect can provide an avenue to enhance the attraction of fibers within the structure of a fiber bundle. The enhanced attraction between fibers can provide an increased level of uniformity in the resulting yarn bundle and thus, improved performance in subsequent fabric formation.

In other aspects, the inventive, modified water dispersible rosin esters can be useful on the surface of other fibrous materials, such as, for example, in hindering the passage of foreign particles through, for example, filter media by providing the cohesive effect demonstrated in interfiber yarn bundles.

In various aspects, the water dispersible rosin ester can comprise any rosin ester material or a derivative thereof suitable for use with the present disclosure. In one aspect, the water dispersible rosin ester can comprise a modified rosin ester. In one aspect, such a modified rosin ester can comprise a Diels-Alder adduct, for example, of an unsaturated ester to a conjugated rosin acid. In another aspect, the modified rosin ester can be neutralized, for example, into water with an alkali, an amine, an aininoalcohol, ammonia, or a combination thereof. In another aspect, the water dispersible rosin ester can comprise an alcohol soluble fumaric modified rosin ester, such as, for example, a FILTREZ™ Series 530 modified rosin ester. Modified rosin esters and conjugated rosin acid starting materials are commercially available from, for example, Lawler, Inc., Chicago, Ill., USA.

In one aspect, the water dispersible rosin ester can be used on spun warp yarn at levels as low as, for example, 0.01 wt. %.

Thus, in various aspects, the present disclosure provides compositions and methods for fiber cohesion improvement in traditional high molecular weight film former warp sizing applications with a stabilized, encapsulated colloidal silica composition. In another aspect, the present disclosure provides fiber cohesion improvement in traditional high molecular weight film former warp sizing applications with modified water dispersible rosin esters. In still another aspect, the present disclosure provides fiber cohesion improvement in texturized filament applications with a stabilized encapsulated colloidal silica complex.

In another aspect, the present disclosure provides fiber cohesion improvement in texturized filament applications. In another aspect, the present disclosure provides fiber cohesion improvement in traditional warp sizing applications with a stabilized encapsulated colloidal silica complex. In yet another aspect, the present disclosure provides fiber cohesion improvement in traditional warp sizing applications with modified water dispersible rosin esters.

In one aspect, the present disclosure provides fiber cohesion improvement in traditional starch warp sizing applications with a stabilized encapsulated colloidal silica complex. In another aspect, the present disclosure provides fiber cohesion improvement in traditional starch warp sizing applications with modified water dispersible rosin esters. In yet another aspect, the present disclosure provides fiber cohesion improvement in traditional starch warp sizing applications with modified water dispersible rosin esters in indigo weaving.

In one aspect, the present disclosure provides fiber cohesion improvement in traditional starch warp sizing applications with modified water dispersible rosin esters. In another aspect, the present disclosure provides fiber cohesion improvement in traditional polyvinyl alcohol and polyvinyl alcohol/starch warp sizing applications with a stabilized encapsulated colloidal silica complex to reduce fiber shed in weaving. In yet another aspect, the present disclosure provides fiber cohesion improvement in traditional polyvinyl alcohol warp sizing applications with modified water dispersible rosin esters to reduce fiber and size shed in slashing.

In one aspect, the present disclosure provides fiber cohesion improvement in traditional polyvinyl alcohol warp sizing applications with a stabilized encapsulated colloidal silica complex to reduce fiber and size shed in slashing. In another aspect, the present disclosure provides fiber cohesion improvement in traditional polyvinyl alcohol and polyvinyl alcohol/starch warp sizing applications with modified water dispersible rosin esters to reduce fiber shed in weaving. In yet another aspect, the present disclosure provides fiber cohesion improvement in traditional starch warp sizing applications with a stabilized encapsulated colloidal silica complex to reduce filling stops in weaving.

In one aspect, the present disclosure provides fiber cohesion improvement in traditional starch warp sizing applications with modified water dispersible rosin esters to reduce filling stops in weaving. In another aspect, the present disclosure provides fiber cohesion improvement in traditional starch warp sizing applications with a stabilized encapsulated colloidal silica complex to improve abrasion resistance in weaving. In yet another aspect, the present disclosure provides fiber cohesion improvement in traditional starch warp sizing applications with modified water dispersible rosin esters to improve abrasion resistance in weaving.

In other aspects, a polyacrylamide, such as, for example, a drum dried polyacrylamide, can function as an effective addition in a warp size formulation for use with spun yarn. In such an aspect, a neutralized rosin ester material can be compatible with the yarn and with the other components of a sizing system. When incorporated into a polyacrylamide material in the drying process, a neutralized rosin ester material, as described herein, can penetrate into, for example, a warp yarn bundle during the sizing process and can provide enhanced fiber cohesion. An exemplary polyacrylamide material can comprise a TSN or other polyacrylamide, available from SNF Holdings (SNFHC), Riceboro, Ga., USA. In one aspect, a polyacrylamide material can have a molecular weight of from about 100,000 to about 400,000 Daltons, from about 100,000 to about 350,000 Daltons, from about 150,000 to about 275,000 Daltons, or about 250,000 Daltons. In other aspects, a polyacrylamide can have a molecular weight lower than or higher than any value specifically recited herein.

In another aspect, polyacrylic acid based materials have historically been utilized in sizing compositions for nylon filaments. In such polyacrylic based systems, the carboxyl acid moiety on the polymer can form an association with a basic amide or amine present on or with a nylon polymer. The neutralized rosin ester technology, as described herein, is not generally compatible with polyacrylic acid based materials, but is compatible with polyacrylic ester based materials. These polyacrylic ester materials can be utilized in a dispersion, wherein no or substantially no carboxylic acid moieties are present. The small size of the rosin esters allows the materials to easily penetrate the bulk of the filament polyester bundle and provide improved inter-fiber cohesion. This improved inter-fiber cohesion can allow for a reduced level of polyacrylic ester size and, at the same time, produce a more stable sized yarn bundle. This approach can reduce the potential of individual filament breaks and warp defects in a woven fabric. In various aspects, the polyacrylic ester material can comprise any polyacrylic ester or polyacrylate material suitable for use in such a sizing treatment. In an exemplary aspect, the polyacrylic ester material can comprise a 25% dispersion of polyacrylate esters, such as, for example, an EM-150 dispersion, available from Ellington-Meese LLC, Easley, S.C., USA.

In another aspect, addition of a polyacrylamide alone to a conventional PVA based size composition (e.g., comprising PVA, starch, wax, and urea) does not result in any significant benefits, whereas addition of a low level of a stabilized polyester resin complex to a conventional PVA based size composition can result in significant improvements in both warp stops and filling stops. Even in such an improved approach, protruding, hard, PVA sized fiber can still generate an unacceptable number of filling stops. Surprisingly, it has been found that if a dried polyacrylamide material, as described above, is contacted with a conventional dry blend formulation (e.g., PVA, starch, wax, urea), and then a stabilized polyester complex is contacted in liquid form, the number of filling stops can be drastically reduced. In one aspect, filling stops can be substantially eliminated in such an approach. In one aspect, the polyester complex can comprise the encapsulated colloidal silica described herein. In another aspect, the polyester complex can comprise a polyester encapsulated colloidal silica. In yet another aspect, the polyester complex can comprise any polyester complex suitable for use with the present disclosure. Reductions in protruding hard size fiber can be, for example, at least about 80%, at least about 85%, at least about 90%, at least about 92%, at least about 94%, at least about 95%, at least about 96%, at least about 97%, at least about 98%, at least about 99%, or higher. In another aspect, reductions in protruding hard sized fiber can be from about 80% to about 90%, from about 85% to about 95%, from about 80% to about 98%, or from about 90% to about 99% or higher. With such reductions in protruding hard sized fiber, substantial reductions in filling stops, such as, for example, at least about 90%, at least about 92%, at least about 94%, at least about 96%, at least about 98%, at least about 99%, or higher. In another aspect, filling stops can be reduced by from about 85% to about 95%, from about 88% to about 97%, from about 90% to about 95%, from about 90% to about 98%, from about 94% to about 99% or higher. In one aspect, filling stops can be eliminated or substantially eliminated in such an approach. This combination is particularly unexpected, given that PVA and polyacrylamides are generally incompatible. While not wishing to be bound by theory, it is believed that, when used with the inventive stabilized polyester complex, PVA and polyacrylamide exist as a single phase liquid, for example, in a warp size bath, together with the polyester complex. In such an approach, as water is removed from the system, the polyester complex can function as a drying agent at the yarn surface where the polyacrylam.ide is concentrated. When the total moisture content reaches, for example, about 10 wt. % or below, or about 7 wt. % or below, the moisture at the yarn surface is significantly lower and the polyacrylamide film becomes brittle. In one aspect, this brittleness can allow a sized yarn sheet to be easily ripped apart at the bust rod section of the machine. Immediately after such a drying stage, the polyacrylamide material's natural affinity for water can result in an attraction of water so as to form a strong polyacrylamide film on the surface of the sized yarn. FIG. 1 illustrates yarn treated with a polyacrylamide-stabilized, polyester resin complex, as described herein. The images on the left side of FIG. 1 illustrate smooth sized yarn, treated as described above, having smooth surfaces. In contrast, the images on the right side of FIG. 1 illustrate yarn lacking similar fiber cohesion. In another aspect, the polyester resin complex can function as a drying aid, allowing the polyacrylamide to lose a sufficient quantity of water as to become brittle and split easily. This drying effect can facilitate easier splitting of the fabric. In another aspect, the polyester resin complex can provide fiber cohesion within the yarn bundle, for example, by being uniformly or substantially uniformly distributed throughout the aqueous size formulation. Such improved fiber cohesion within the yarn bundle can allow the sized fiber to remain with the yarn during splitting.

Thus, the inventive compositions and methods described herein can provide significant improvement in fiber cohesion by, in some aspects, providing and enhancing drying of the sized yarn surface. Yarn and fiber treated as described herein can, in various aspects, provide significantly improved weaving efficiency and can substantially reduce shedding.

In various aspects, the inventive compositions and methods described herein can result in a reduction in warp stops, when weaving a treated fiber, yarn, or filament, of at least about 20%, at least about 40%, at least about 60%, or at least about 80%. In another aspect, the inventive compositions and methods described herein can result in a reduction in warp stops, when weaving a treated fiber, yarn, or filament, of about 20%, about 40%, about 60%, or about 80%. In another aspect, the inventive compositions and methods described herein can result in a reduction in filling stops, when weaving a treated fiber, yarn, or filament, of at least about 15%, at least about 25%, at least about 40%, at least about 60%, or at least about 80%. In another aspect, the inventive compositions and methods described herein can result in a reduction in filling stops, when weaving a treated fiber, yarn, or filament, of about 15%, about 25%, about 40%, about 60%, or about 80%. In another aspect, the inventive compositions and methods described herein can result in an improvement in weaving efficiency of at least about 5%, at least about 8%, or at least about 10%, as compared to a conventional weaving process not using the compositions described herein. In still another aspect, the inventive compositions and methods described herein can result in an improvement in weaving efficiency of about 5%, about 8%, or about 10% as compared to a conventional weaving process not using the compositions described herein.

The present disclosure and the inventive technologies recited herein can be described in the following aspects. It should be understood that these recited aspects are not intended to be limiting, and that other aspects can be derived from the disclosure.

Aspect 1: A composition comprising an encapsulated colloidal silia and urea.

Aspect 2: The composition of Aspect 1, wherein at least a portion of the colloidal silica is at least partially encapsulated in a polymeric resin.

Aspect 3: The composition of Aspect 1, wherein all or substantially all of the colloidal silica is encapsulated in a polymeric resin.

Aspect 4: The composition of Aspect 2 or Aspect 3, wherein the polymeric resin comprises a polyester resin.

Aspect 5: The composition of Aspect 2 or Aspect 3, wherein the polymeric resin has an average molecular weight of from about 1,000 to about 7,000.

Aspect 6: The composition of Aspect 2 or Aspect 3, wherein the polymeric resin has an average molecular weight of from about 5,000 to about 7,000.

Aspect 7: The composition of Aspect 2 or Aspect 3, wherein the polymeric resin comprises a polyester resin prepared from isophthalic acid, a glycol, and trimellitic anhydride.

Aspect 8: The composition of Aspect 2 or Aspect 3, wherein the polymeric resin is aqueous based.

Aspect 9: The composition of Aspect 2 or Aspect 3, wherein the polymeric resin is water dispersible.

Aspect 10: The composition of Aspect 1, wherein the colloidal silica has an average particle size of from about 4 nm to about 150 nm.

Aspect 11: The composition of Aspect 1, wherein the colloidal silica has an average particle size of from about 10 nm to about 50 nm.

Aspect 12: The composition of Aspect 1, wherein the colloidal silica has an average particle size of about 10 nm.

Aspect 13: The composition of Aspect 1, wherein the colloidal silica has an average particle size of about 20 nm.

Aspect 14: The composition of Aspect 1, wherein the colloidal silica has an average particle size of about 50 nm.

Aspect 15: The composition of Aspect 2 or Aspect 3, wherein the weight ratio of polymeric resin to colloidal silica is from about 3:1 to about 100:1.

Aspect 16: The composition of Aspect 2 or Aspect 3, wherein the weight ratio of polymeric resin to colloidal silica is from about 3:1 to about 25:1.

Aspect 17: The composition of Aspect 2 or Aspect 3, wherein the weight ratio of polymeric resin to colloidal silica is from about 3:1 to about 10:1.

Aspect 18: The composition of Aspect 2 or Aspect 3, wherein the weight ratio of polymeric resin to colloidal silica is about 3:1.

Aspect 19: The composition of Aspect 2 or Aspect 3, wherein the weight ratio of urea to the combination of polymeric resin and colloidal silica is from about 0.5:1 to about 5:1.

Aspect 20: The composition of Aspect 2 or Aspect 3, wherein the weight ratio of urea to the combination of polymeric resin and colloidal silica is from about 0.5:1 to about 1:1.

Aspect 21: The composition of Aspect 2 or Aspect 3, wherein the weight ratio of urea to the combination of polymeric resin and colloidal silica is from about 1:1 to about 2:1.

Aspect 22: The composition of Aspect 2 or Aspect 3, wherein the weight ratio of urea to the combination of polymeric resin and colloidal silica is from about 0.5:1 to about 2:1.

Aspect 23: The composition of Aspect 2 or Aspect 3, wherein the weight ratio of urea to the combination of polymeric resin and colloidal silica is about 1:1.

Aspect 24: The composition of any preceding Aspect, further comprising a high molecular weight polymeric material.

Aspect 25: The composition of Aspect 24, wherein the high molecular weight polymeric material comprises a starch.

Aspect 26: The composition of Aspect 24, wherein the high molecular weight polymeric material comprises corn starch.

Aspect 27: The composition of Aspect 24, wherein the high molecular weight polymeric material comprises a modified starch.

Aspect 28: The composition of Aspect 24, wherein the high molecular weight polymeric material comprises polyvinyl alcohol.

Aspect 29: The composition of Aspect 1 or Aspect 24, further comprising a wax, a lubricant, a humectant, or a combination thereof.

Aspect 30: A composition comprising a water dispersible rosin ester and a polyacrylamide.

Aspect 31: The composition of Aspect 30, wherein the water dispersible rosin ester comprises a neutralized Diels-Alder adduct of an unsaturated ester to a conjugated rosin acid.

Aspect 32: The composition of Aspect 30, wherein the polyacrylamide comprises a drum dried polyacrylamide.

Aspect 33: The composition of Aspect 30, wherein the polyacrylamide has a molecular weight of from about 100,000 to about 400,000 Daltons.

Aspect 34: A composition comprising a water dispersible rosin ester and a polyacrylic ester.

Aspect 35: The composition of Aspect 34, wherein the polyacric ester comprises about a 25% dispersion of polyacrylate esters.

Aspect 36: A composition comprising a polyacrylamide, a high molecular weight polymeric material, and a stabilized polyester complex.

Aspect 37: A composition comprising a polyacrylamide, a high molecular weight polymeric material, and a stabilized, encapsulated colloidal silica.

Aspect 38: The composition of Aspect 36 or Aspect 37, wherein the high molecular weight polymeric material comprises a starch.

Aspect 39: The composition of Aspect 36 or Aspect 37, wherein the high molecular weight polymeric material comprises corn starch.

Aspect 40: The composition of Aspect 36 or Aspect 37, wherein the high molecular weight polymeric material comprises a modified starch.

Aspect 41: The composition of Aspect 36 or Aspect 37, wherein the high molecular weight polymeric material comprises polyvinyl alcohol.

Aspect 42: A method of preparing the composition of Aspect 1, comprising contacting a colloidal silica, a polymeric material, and urea.

Aspect 43: The method of Aspect 42, wherein the polymeric material is present in a quantity sufficient to at least partially encapsulate at least a portion of the colloidal silica.

Aspect 44: The method of Aspect 42, wherein the polymeric material is present in a quantity sufficient to at least encapsulate all or substantially all of the colloidal silica.

Aspect 45: The method of Aspect 42, wherein the polymeric resin comprises a polyester resin.

Aspect 46: The method of Aspect 42, wherein the polymeric resin has an average molecular weight of from about 1,000 to about 7,000.

Aspect 47: The method of Aspect 42, wherein the polymeric resin has an average molecular weight of from about 5,000 to about 7,000.

Aspect 48: The method of Aspect 42, wherein the polymeric resin comprises a polyester resin prepared from isophthalic acid, a glycol, and trimellitic anhydride.

Aspect 49: The method of Aspect 42, wherein the polymeric resin is aqueous based.

Aspect 50: The method of Aspect 42, wherein the polymeric resin is water dispersible.

Aspect 51: The method of Aspect 42, wherein the colloidal silica has an average particle size of from about 4 nm to about 150 nm.

Aspect 52: The method of Aspect 42, wherein the colloidal silica has an average particle size of from about 10 nm to about 50 nm.

Aspect 53: The method of Aspect 42, wherein the colloidal silica has an average particle size of about 10 nm.

Aspect 54: The method of Aspect 42, wherein the colloidal silica has an average particle size of about 20 nm.

Aspect 55: The method of Aspect 42, wherein the colloidal silica has an average particle size of about 50 nm.

Aspect 56: The method of Aspect 42, wherein the weight ratio of polymeric resin to colloidal silica is from about 3:1 to about 100:1.

Aspect 57: The method of Aspect 42, wherein the weight ratio of polymeric resin to colloidal silica is from about 3:1 to about 25:1.

Aspect 58: The method of Aspect 42, wherein the weight ratio of polymeric resin to colloidal silica is from about 3:1 to about 10:1.

Aspect 59: The method of Aspect 42, wherein the weight ratio of polymeric resin to colloidal silica is about 3:1.

Aspect 60: The method of Aspect 42, wherein the weight ratio of urea to the combination of polymeric resin and colloidal silica is from about 0.5:1 to about 5:1.

Aspect 61: The method of Aspect 42, wherein the weight ratio of urea to the combination of polymeric resin and colloidal silica is from about 0.5:1 to about 1:1.

Aspect 62: The method of Aspect 42, wherein the weight ratio of urea to the combination of polymeric resin and colloidal silica is from about 1:1 to about 2:1.

Aspect 63: The method of Aspect 42, wherein the weight ratio of urea to the combination of polymeric resin and colloidal silica is from about 0.5:1 to about 2:1.

Aspect 64: The method of Aspect 42, wherein the weight ratio of urea to the combination of polymeric resin and colloidal silica is about 1:1.

Aspect 65: The method of Aspect 42, further comprising contacting a high molecular weight polymeric material.

Aspect 66: The method of Aspect 65, wherein the high molecular weight polymeric material comprises a starch.

Aspect 67: The method of Aspect 65, wherein the high molecular weight polymeric material comprises corn starch.

Aspect 68: The method of Aspect 65, wherein the high molecular weight polymeric material comprises a modified starch.

Aspect 69: The method of Aspect 65, wherein the high molecular weight polymeric material comprises polyvinyl alcohol.

Aspect 70: The method of Aspect 42 or Aspect 65, further comprising contacting a wax, a lubricant, a humectant, or a combination thereof.

Aspect 71: The method of Aspect 42, wherein the quantity of urea is sufficient to stabilize the colloidal silica.

Aspect 72: A method for preparing the composition of Aspect 30, comprising contacting a water dispersible rosin ester and a polyacrylamide.

Aspect 73: A method for preparing the composition of Aspect 34, comprising contacting a water dispersible rosin ester and a polyacrylic ester.

Aspect 74: A method for preparing the composition of Aspect 36, comprising contacting a polyacrylamide, a high molecular weight polymeric material, and a stabilized polyester complex.

Aspect 75: A method for preparing the composition of Aspect 37, comprising contacting a polyacrylamide, a high molecular weight polymeric material, and a stabilized, encapsulated colloidal silica.

Aspect 76: A method for treating a fiber or yarn, the method comprising contacting the fiber or yarn with the composition of Aspect 1.

Aspect 77: The method of Aspect 76, wherein contacting occurs during a rinse.

Aspect 78: The method of Aspect 76, wherein contacting occurs by subjecting the fiber or yarn to a bath comprising a stabilized, encapsulated colloidal silica.

Aspect 79: The method of Aspect 76, wherein the composition further comprises one or more components of a conventional size formulation.

Aspect 80: The method of Aspect 76, wherein contacting occurs by rinsing a packaged dye from the fiber or yarn.

Aspect 81: The method of Aspect 76, wherein the encapsulated colloidal silica is present at an amount of from about 0.1 wt. % to about 2 wt. % of a primary size formulation.

Aspect 82: The method of Aspect 76, wherein the encapsulated colloidal silica is present at a concentration of from about 0.1 wt. % to about 20 wt. % of the fiber or yarn.

Aspect 83: The method of Aspect 76, wherein the encapsulated colloidal silica is present at a concentration of from about 0.5 wt. % to about 5 wt. % of the fiber or yarn.

Aspect 84: The method of Aspect 76, wherein the encapsulated colloidal silica is present at a concentration of about 0.5 wt. % of the fiber or yarn.

Aspect 85: A method for treating a fiber or a yarn, comprising contacting the fiber or yarn with a water dispersible rosin ester.

Aspect 86: A method for treating a fiber or a yarn, comprising contacting the fiber or yarn with a water dispersible rosin ester or a derivative thereof.

Aspect 87: The method of Aspect 85 or Aspect 86, wherein the amount of water dispersible rosin ester is less than about 0.5 wt. %.

Aspect 88: The method of Aspect 85 or Aspect 86, wherein the amount of water dispersible rosin ester is less than about 0.1 wt. %.

Aspect 89: A method for treating a spun yarn, comprising contacting a neutralized water dispersible rosin ester material, a polyacrylamide material, and optionally one or more components of a conventional size formulation, with the spun yarn.

Aspect 90: A method for treating a nylon filament, comprising contacting a neutralized water dispersible rosin ester material, a polyacrylic ester material, and optionally one or more components of a conventional size formulation, with the nylon filament.

Aspect 91: A method thr treating a fiber, comprising contacting a dry polyacrylamide material with one or more dry components of a conventional size formulation, and then contacting with a stabilized polyester complex in liquid form, and then contacting the resulting formulation with a fiber.

Aspect 92: The method of Aspect 91, wherein the stabilized polyester complex comprises a stabilized, encapsulated colloidal silica.

Aspect 93: The method of Aspect 91, wherein the one or more components of a conventional size formulation comprise a polyvinyl alcohol, a starch, a wax, a urea, or a combination thereof.

Aspect 94: The method of any preceding Aspect, wherein warp stops during weaving of a treated fiber are reduced by at least about 20%, as compared to conventional methods not using the compositions recited herein.

Aspect 95: The method of any preceding Aspect, wherein warp stops during weaving of a treated fiber are reduced by at least about 40%, as compared to conventional methods not using the compositions recited herein.

Aspect 96: The method of any preceding Aspect, wherein warp stops during weaving of a treated fiber are reduced by at least about 60%, as compared to conventional methods not using the compositions recited herein.

Aspect 97: The method of any preceding Aspect, wherein warp stops during weaving of a treated fiber are reduced by at least about 80%, as compared to conventional methods not using the compositions recited herein.

Aspect 98: The method of any preceding Aspect, wherein filling stops during weaving of a treated fiber are reduced by at least about 15%, as compared to conventional methods not using the compositions recited herein.

Aspect 99: The method of any preceding Aspect, wherein filling stops during weaving of a treated fiber are reduced by at least about 25%, as compared to conventional methods not using the compositions recited herein.

Aspect 100: The method of any preceding Aspect, wherein filling stops during weaving of a treated fiber are reduced by at least about 40%, as compared to conventional methods not using the compositions recited herein.

Aspect 101: The method of any preceding Aspect, wherein filling stops during weaving of a treated fiber are reduced by at least about 60%, as compared to conventional methods not using the compositions recited herein.

Aspect 102: The method of any preceding Aspect, wherein filling stops during weaving of a treated fiber are reduced by at least about 80%, as compared to conventional methods not using the compositions recited herein.

Aspect 103: The method of any preceding Aspect, wherein weaving efficiency of a treated fiber is improved by at least about 5%, as compared to conventional methods not using the compositions recited herein.

Aspect 104: The method of any preceding Aspect, wherein weaving efficiency of a treated fiber is improved by at least about 8%, as compared to conventional methods not using the compositions recited herein.

Aspect 105: The method of any preceding Aspect, wherein weaving efficiency of a treated fiber is improved by at least about 10%, as compared to conventional methods not using the compositions recited herein.

Aspect 106: The method of any preceding Aspect, wherein weaving efficiency of a treated fiber is improved by about 5%, as compared to conventional methods not using the compositions recited herein.

Aspect 107: The method of any preceding Aspect, wherein weaving efficiency of a treated fiber is improved by about 5%, as compared to conventional methods not using the compositions recited herein.

Aspect 108: The method of any preceding Aspect, wherein fiber shed is significantly reduced, as compared to conventional methods not using the compositions recited herein.

Aspect 109: The method of any preceding Aspect, wherein less conventional size formulation is required to achieve similar results, as compared to conventional methods not using the compositions recited herein.

EXAMPLES

It should be understood that the inventive stabilized, encapsulated colloidal silica compositions were added to size formulations and practices established by current size chemical suppliers. Studies with established size formulations with and without low levels of the nanosized compositions were conducted. The nanosized compositions were added to a standard sizing cook and employed the standard formulations as controls. Additions of the stabilized, encapsulated colloidal silica compositions were based on the dry solids content of the primary size formulation. All evaluations were adjusted with water to provide equal add-on to the control sized yarn and on the sized yarn containing the stabilized, encapsulated colloidal silica. No changes in current practices were made.

Example 1—Preparation of Polyester Encapsulated Silica

A low molecular weight polyester resin was prepared in a 2 phase high temperature reaction to initially prepare a polymer from isophthalic acid and diethylene glycol followed by a coupling of the polyester glycol with trimellitic anhydride to form a controlled 3-dimensional gel that can be dispersed in water by organic alkanolamine materials. The complex is formed by the encapsulation of the waterborne colloidal silica by the low molecular weight polyester resin in the water media. Requirement levels of the low molecular weight polyester resin are dependent upon completely encapsulating the theoretical surface area of the colloid under consideration. Based on this criteria, encapsulation levels of the polyester resin will be dependent upon the actual average size of the colloid and the surface areas. These surface areas range from 20 square meters/gram of material to 750 square meters/gram of the colloid, based on the average size and diameter of the colloid under consideration. The ratio of resin to colloid will range from 3 parts resin/part colloid to essentially an unlimited ratio to present escape and reaction of colloidal particles to form a gel.

Example 2—Preparation of Stabilized Encapsulated Colloidal Silica

The low molecular weight polyester resin prepared in Example 1 was combined with a quantity of colloidal silica sufficient to encapsulate the colloidal silica and a quantity of carbamide (i.e., urea) sufficient to stabilize the encapsulated colloidal silica.

Example 3—Laboratory Evaluation

Microscopic evaluation of yarns from each trial demonstrated a more compact sized yarn with the capsulated colloidal silica additive than the corresponding control. Significantly less protruding hard sized fiber was noted on the sized yarn containing the encapsulated colloidal silica. INSTRON® and STATAMAT® tensile and elongation data of hard yarn demonstrated a lower coefficient of variation than the control hard yarns.

It was also observed that the abrasion resistance of sized yarn was improved over the corresponding control samples.

At the slasher, it was observed that the inventive treated samples exhibited an easier and smoother break at the bust bar section than the corresponding control samples. This smoother break has been attributed to enhanced fiber cohesion within the hard sized yarn bundle. Lower levels of size and fiber shed were also observed at the bust bar section. The more compact structure allows significantly more of the hard sized yarn to be placed on the loom beam.

On the loom, the inventive treated samples exhibited reduced warp stops, reduced fill stops, reduced size shed, and reduced fiber shed, as compared to the control samples Example 4—Laboratory and Large-Scale Evaluation Evaluations of the stabilized polyester encapsulated colloidal silica products have been completed in both the lab and in commercial operations. The inventive compositions provide essentially the same fiber cohesion effects in commercial machinery evaluations as observed in laboratory settings, with the same improvements in facilitating fabric formation. The inventive composition thus provides improved fiber cohesion in improved weaving performance. An advantage of the inventive compositions is an improvement in the physical properties of yarn after the yarn is already made in the sizing process.

Example 5—Film Studies

In cases where field evaluations were not practical to perform, established testing procedures have been utilized to determine both adhesion and fiber cohesion properties of the inventive compositions on thin polyester film.

Fiber cohesion improvements have been determined on virtually all fibers and fiber blends with the inventive compositions, the only exceptions being TEFLON® substrates and polypropylene substrates, the latter of which functions well when water dispersible rosin ester derivatives are utilized. In one aspect, the modified rosin ester materials can provide excellent adhesion to polypropylene substrates.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state that steps are to be limited to a specific order, no order is to be inferred.

Example 6—Plant Trial—Aidet Weaving

In a sixth example, the stabilized polyester encapsulated colloidal silica was added to an existing, conventional size formulation and applied to 40's ring spun cotton. With only the conventional size formulation (i.e., without the stabilized polyester encapsulated colloidal silica), a weaving efficiency of 87.5% was achieved, with combined warp and filling stops totaling 10.17 stops per hundred thousand pix. When the stabilized polyester encapsulated colloidal silica was added to the conventional size formulation, weaving efficiency increased to 96.5%, and the combined warp and filling stops were reduced to 3.19 stops per hundred thousand pix. Thus, a reduction in warp and filling stops of 68.6% was achieved due to use of the stabilized polyester encapsulated colloidal silica.

Example 7—Percale Sheeting

In a seventh example, the stabilized polyester encapsulated colloidal silica was applied to a sized 100% VORTEX® brand cotton in a pre-wet foaming unit. When woven on an air jet loom, the treated cotton (i.e., treated with the stabilized polyester encapsulated colloidal silica) exhibited a reduction in warp stops of greater than 20% and a reduction in filling stops of 43%, as compared to the use of a conventional size formulation alone.

Example 8—Bottomweight Fabric

In an eighth example, a conventional size formulation for weaving a bottomweight fabric (i.e., a heavier cotton fabric typically used for pants) on an air jet loom comprised 400 lbs. of dry blend primary size plus 166 lbs. of 30% polyester resin binder. Weaving using this conventional formulation resulted in 4.05 warp stops per hundred thousand pix. When the conventional size formulation was replaced with a combination of 400 lbs. of dry blend primary size and 40 lbs. of the 25% stabilized polyester encapsulated colloidal silica, the warp stops were reduced to 0.77 stops per hundred thousand pix, a reduction of greater than 80% using 126 lbs. less total size material.

Example 9—Dyed Terry and Warp Pile

In an ninth example, the stabilized polyester encapsulated colloidal silica was applied to a dyed terry pile during the final rinse of the dye process. When woven on a projectile loom, the treated, dyed terry pile exhibited a reduction in pile warp stops of greater than 41% and a reduction in filling stops of 15%, as compared to the use of a conventional process.

Example 10—Pilling Stop Study

In a tenth example, 3 dyed yarns for a terry fabric were woven on an air jet loom. The standard rate of filling stops was 16.2 stops per hundred thousand pix. When the dyed yarns were rinsed with 1 wt. % of the stabilized polyester encapsulated colloidal silica, filling stops were significantly reduced to 2.3 stops per hundred thousand pix, a reduction of over 85% due to the use of the stabilized polyester encapsulated colloidal silica.

Example 11—Striped Shirting

In a eleventh example, the stabilized polyester encapsulated colloidal silica was used in a rinse on dyed TENCEL® brand cellulosic rayon fiber. Use of the inventive stabilized polyester encapsulated colloidal silica resulted in a reduction in total warp and filling stops of over 45%, as compared to a rinse not containing the stabilized polyester encapsulated colloidal silica. In addition to the reduction in warp and filling stops, a significant reduction in cross-contamination was observed. Cross-contamination can occur, for example, when different color fibers are woven in close proximity and one color becomes contaminated with the other color. Thus, use of the inventive stabilized polyester encapsulated colloidal silica can improve the quality of high-end fabrics by significantly reducing cross-contamination.

Example 12—PET Dyed & Rinsed

Figure 2:
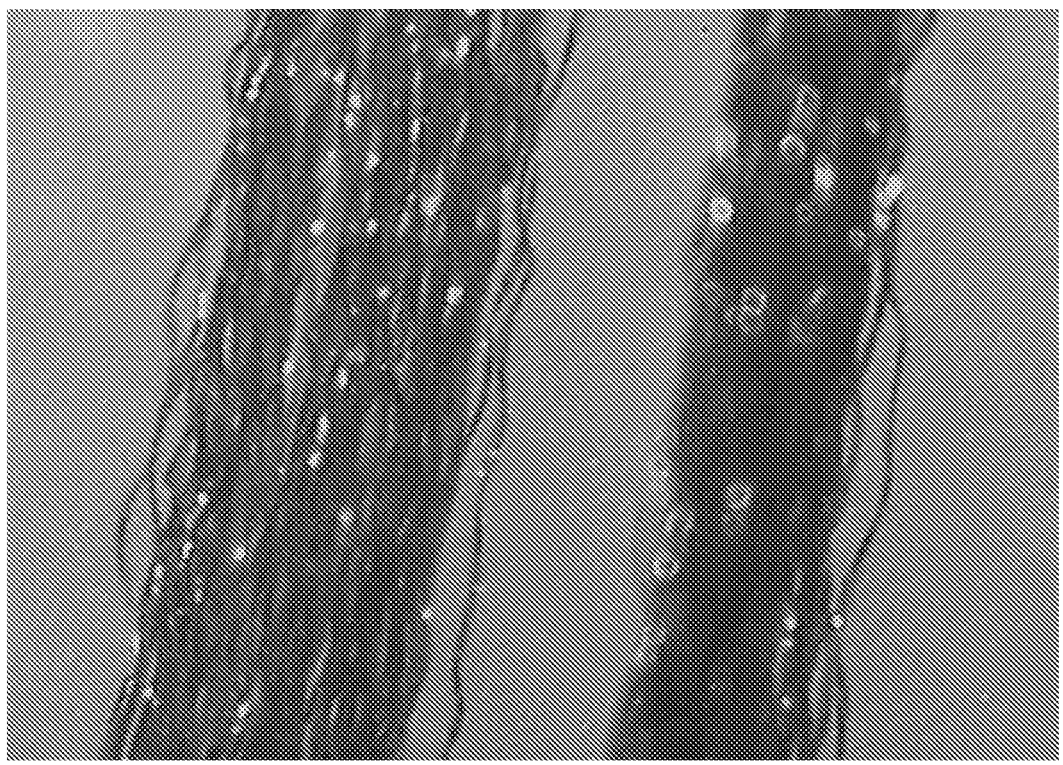
FIG. 2 illustrates a 2-ply, texturized polyethylene terephthalate (PET) fiber that was package dyed and rinsed with a dispersion comprising 0.5 wt. % of stabilized polyester encapsulated colloidal silica product on yarn, wherein the dyed, untreated yarn is illustrated on the left side of the image, and the rinsed/treated and compacted yarn is illustrated on the right side of the image, in accordance with various aspects of the present disclosure.

In a twelfth example, a 2-ply, texturized polyethylene terephthalate (PET) fiber was package dyed and rinsed with a dispersion comprising 0.5 wt. % of the stabilized polyester encapsulated colloidal silica product on yarn. The rinse resulted in significant compaction of the yarn, as illustrated in FIG. 2 (dyed, untreated yarn on the left side of the image, and rinsed/treated and compacted yarn on the right side of the image). When used as a filling yarn on an air jet loom, the treated PET fiber allowed an increase in loom speed of 12.5%. When the loom was adjusted and returned to its standard speed, it was observed that the air required to nm the loom was reduced by over 20%.

Example 13—12's Ring Spun Cotton

Figure 3:
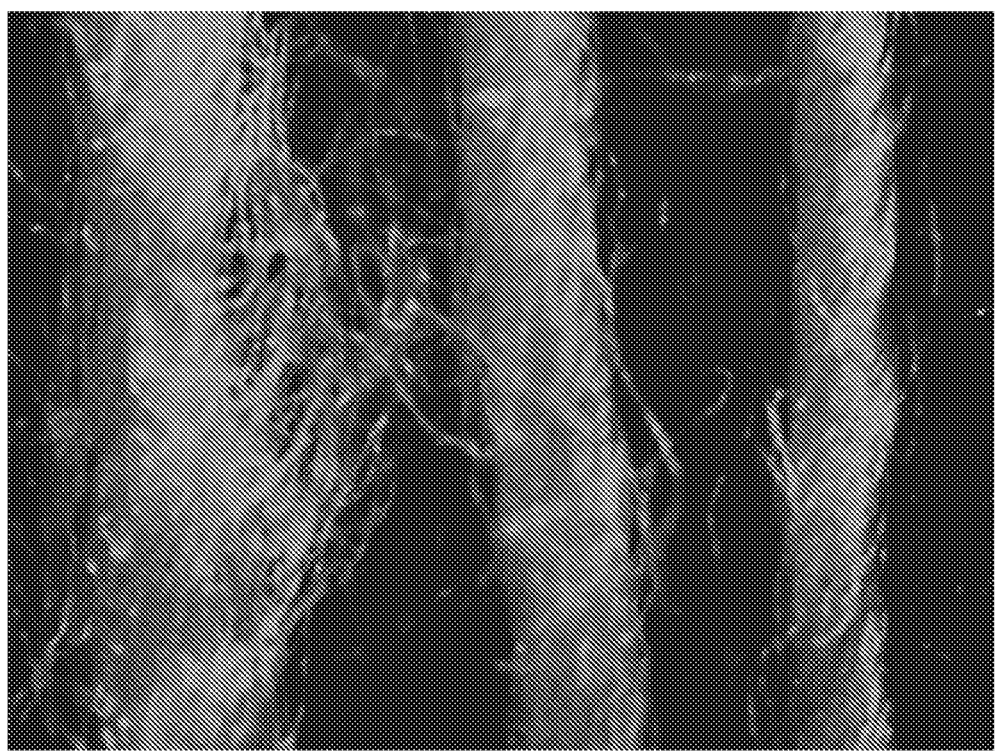
FIG. 3 illustrates an as-received 12's ring spun cotton that was water rinsed, and then rinsed with a dispersion comprising 0.5 wt. % of stabilized polyester encapsulated colloidal silica product, wherein the as-received cotton is illustrated on the left side of the image, the water rinsed yarn is illustrated in the middle of the image, and the yarn rinsed with the stabilized polyester encapsulated colloidal silica is illustrated on the right side of the image, in accordance with various aspects of the present disclosure.

In a thirteenth example, as-received 12's ring spun cotton was water rinsed, and then rinsed with a dispersion comprising 0.5 wt. % of the stabilized polyester encapsulated colloidal silica product. Each of the three yarns are illustrated in FIG. 3, the as-received cotton on the left side of the image, the water rinsed yarn in the middle of the image, and the yarn rinsed with the stabilized polyester encapsulated colloidal silica on the right side of the image. In addition to improving compaction of the yarn, as illustrated in FIG. 3, the inventive treatment also resulted in substantially less plugging of lubrication ports on the loom and thus, improved fabric quality, productivity, and reduced or eliminated shut down to blow off and clean the machine.

Example 14—Warp Sizing Using Rosin Ester

In a fourteenth example, a conventional size formulation comprising starch, wax, and urea, was utilized for air jet weaving of a ring spun cotton denim. Using the conventional size formulation, air jet weaving resulting in 3.2 warp stops per hundred thousand pix and 5.7 filling stops per hundred thousand pix. When 6 lbs. of the inventive rosin ester product was added for each 100 lbs. of conventional dry size mix, warp stops were reduced to 1.6 stops per hundred thousand pix (a 50% reduction) and filling stops were reduced to 3.3 stops per hundred thousand pix (a 42% reduction)/in addition to the reduction in warp and filling stops, fiber shedding was significantly reduced during weaving.

Example 15—Rosin Ester Improvements in Weaving Efficiency

In a fifteenth example, a fabric style containing a polyester/cotton warp yarn was being produced on an air jet loom. Due to the particular product and manufacturer, the use of PVA was prohibited in the warp size formulation. When a conventional warp size formulation comprising starch, wax, and urea was utilized with a high level of a polyacrylic binder, a standard efficiency of 75% was achieved. After the inventive rosin ester product was added to the conventional size thrmulation at a level of 7 wt. %, and the solids adjusted to provide the same level of size add-on, the weaving efficiency on the air jet loom increased from 75% to 85%, together with dramatically reduced fiber and size shedding. Thus, use of the inventive rosin ester resulted in a 10% net improvement in weaving efficiency and dramatic improvements in fiber and size shedding.

Throughout this application, various publications are referenced. The disclosures of these publications in their entireties are hereby incorporated by reference into this application in order to more fully describe the state of the art to which this application pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publications provided herein can be different from the actual publication dates, which can require independent confirmation.

What is claimed is:

1. A composition comprising a water dispersible rosin ester and a polyacrylamide, wherein the water dispersible rosin ester comprises a neutralized Diels-Alder adduct of an unsaturated ester to a conjugated rosin acid.

2. The composition of claim 1, wherein the polyacrylamide comprises a drum dried polyacrylamide.

3. The composition of claim 1, wherein the polyacrylamide has a molecular weight of from about 100,000 to about 400,000 Daltons.

4. A method for preparing the composition of claim 1, comprising contacting a water dispersible rosin ester and a polyacrylamide.

5. A method for treating a fiber or a yarn, comprising contacting the fiber or yarn with a water dispersible rosin ester or a derivative thereof.

6. The method of claim 5, wherein the amount of water dispersible rosin ester is less than about 0.5 wt. %.

7. The method of claim 5, wherein the amount of water dispersible rosin ester is less than about 0.1 wt. %.

8. The method of claim 5, wherein the fiber or yarn comprises a spun yarn, and wherein contacting comprises contacting a neutralized water dispersible rosin ester material, and a polyacrylamide material, with the spun yarn.

9. The method of claim 8, wherein contacting comprises contacting a neutralized water dispersible rosin ester material, a polyacrylamide material, and one or more components of a conventional size formulation, with the spun yarn.

10. The method of claim 5, wherein the fiber or yarn comprises a nylon filament, and wherein contacting comprises contacting a neutralized water dispersible rosin ester material, and a polyacrylic ester material, with the nylon filament.

11. The method of claim 10, wherein the fiber or yarn comprises a nylon filament, and wherein contacting comprises contacting a neutralized water dispersible rosin ester material, a polyacrylic ester material, and one or more components of a conventional size formulation, with the nylon filament.

* * * * *